Patented June 23, 1931

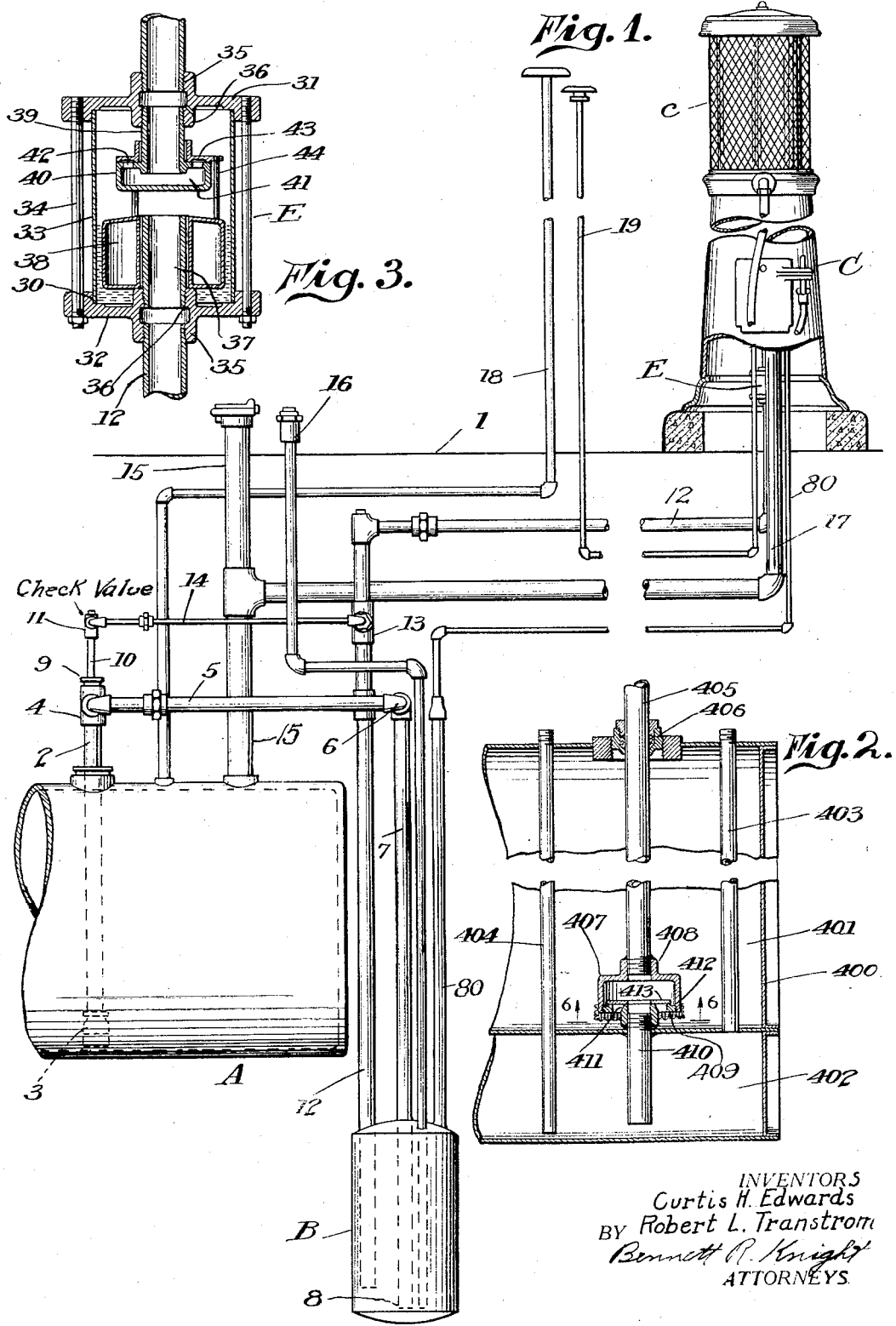

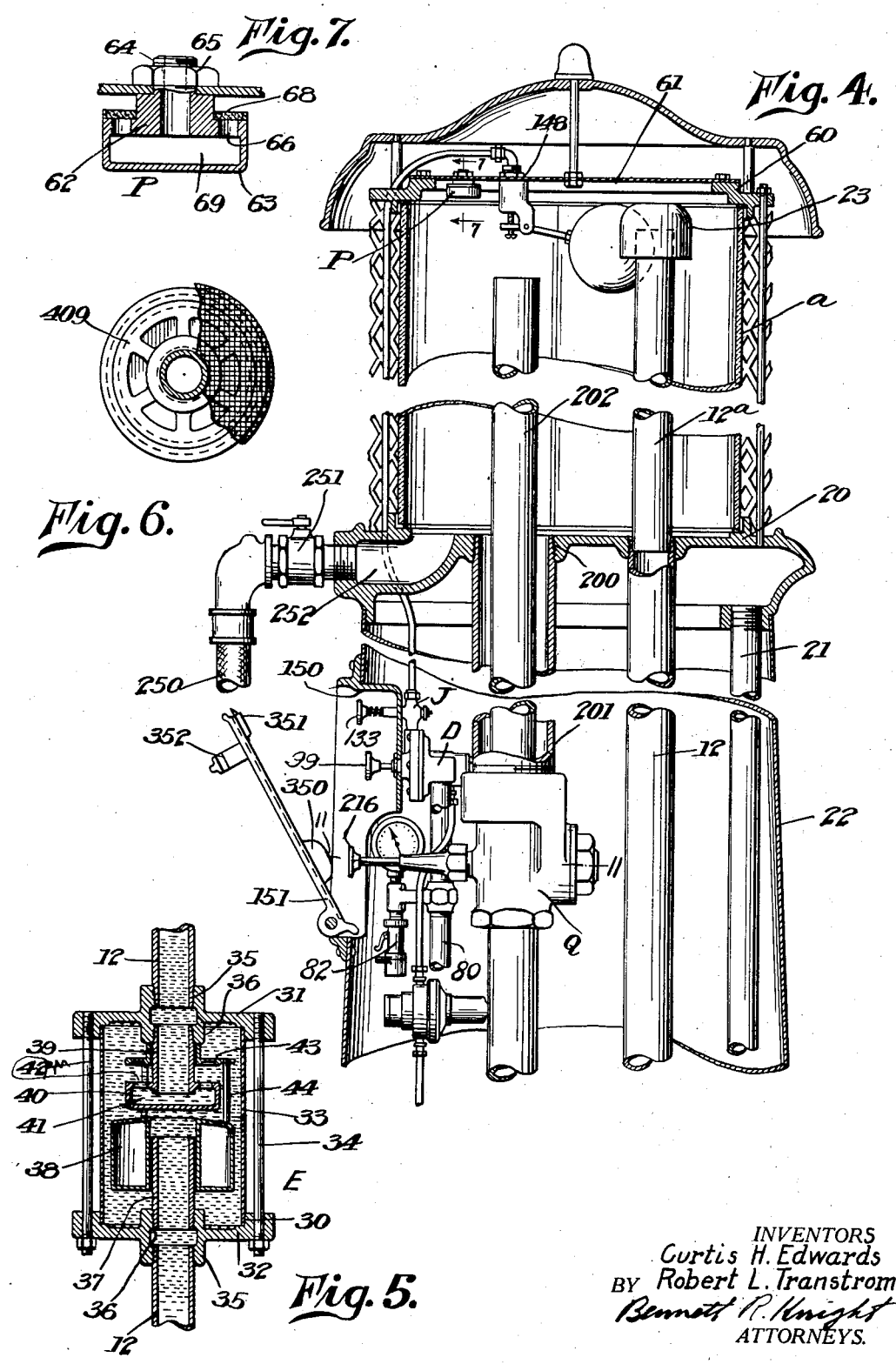

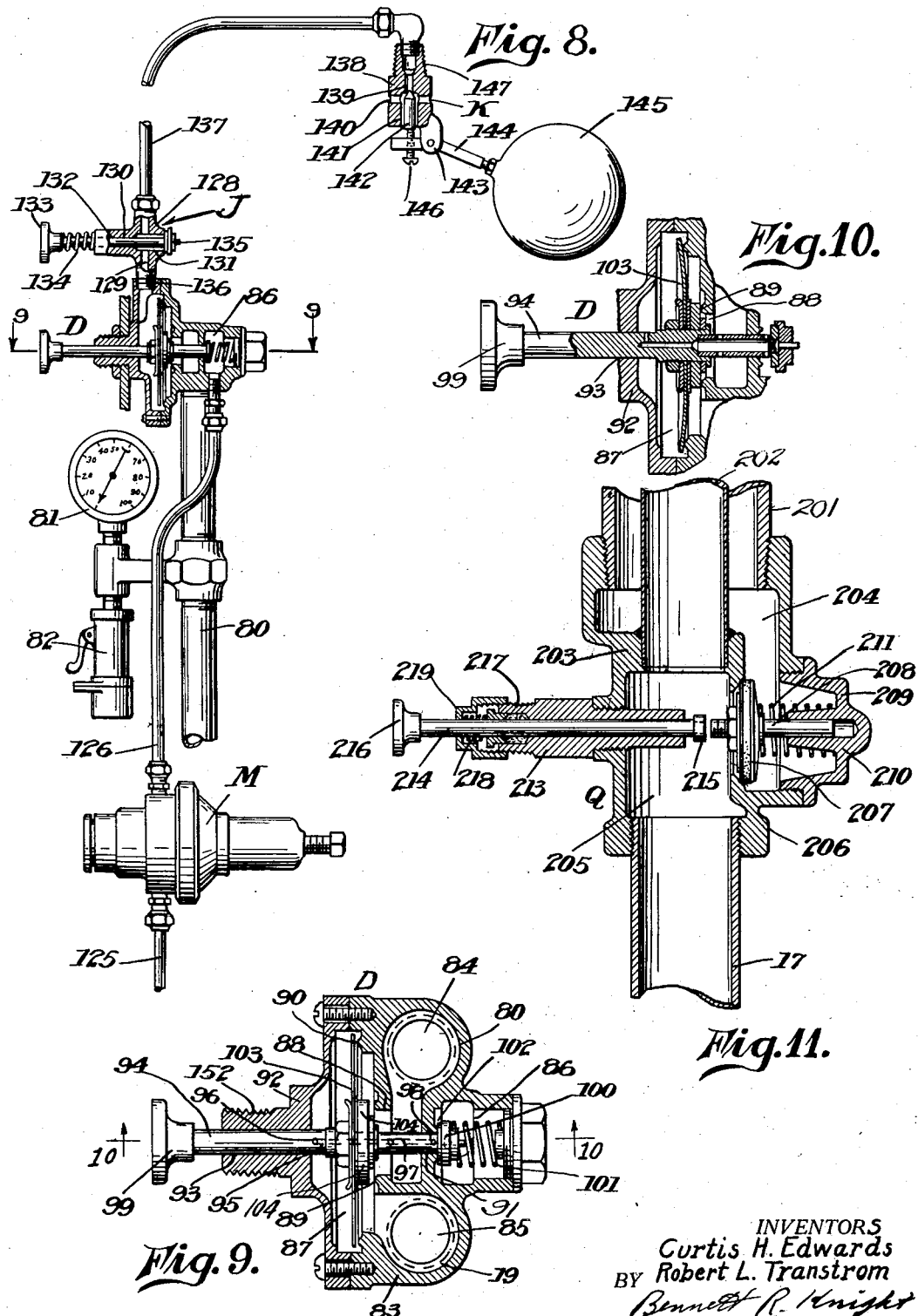

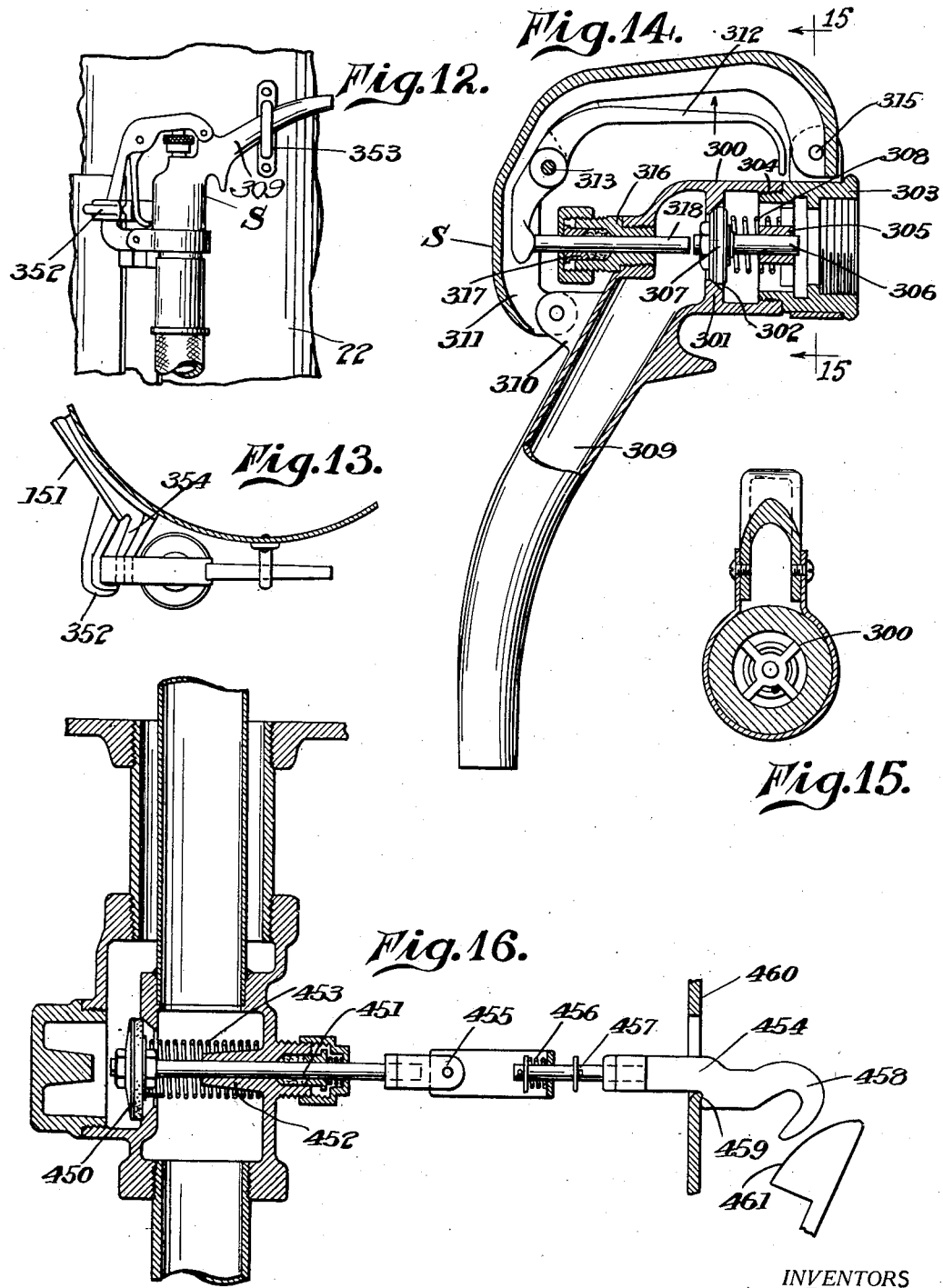

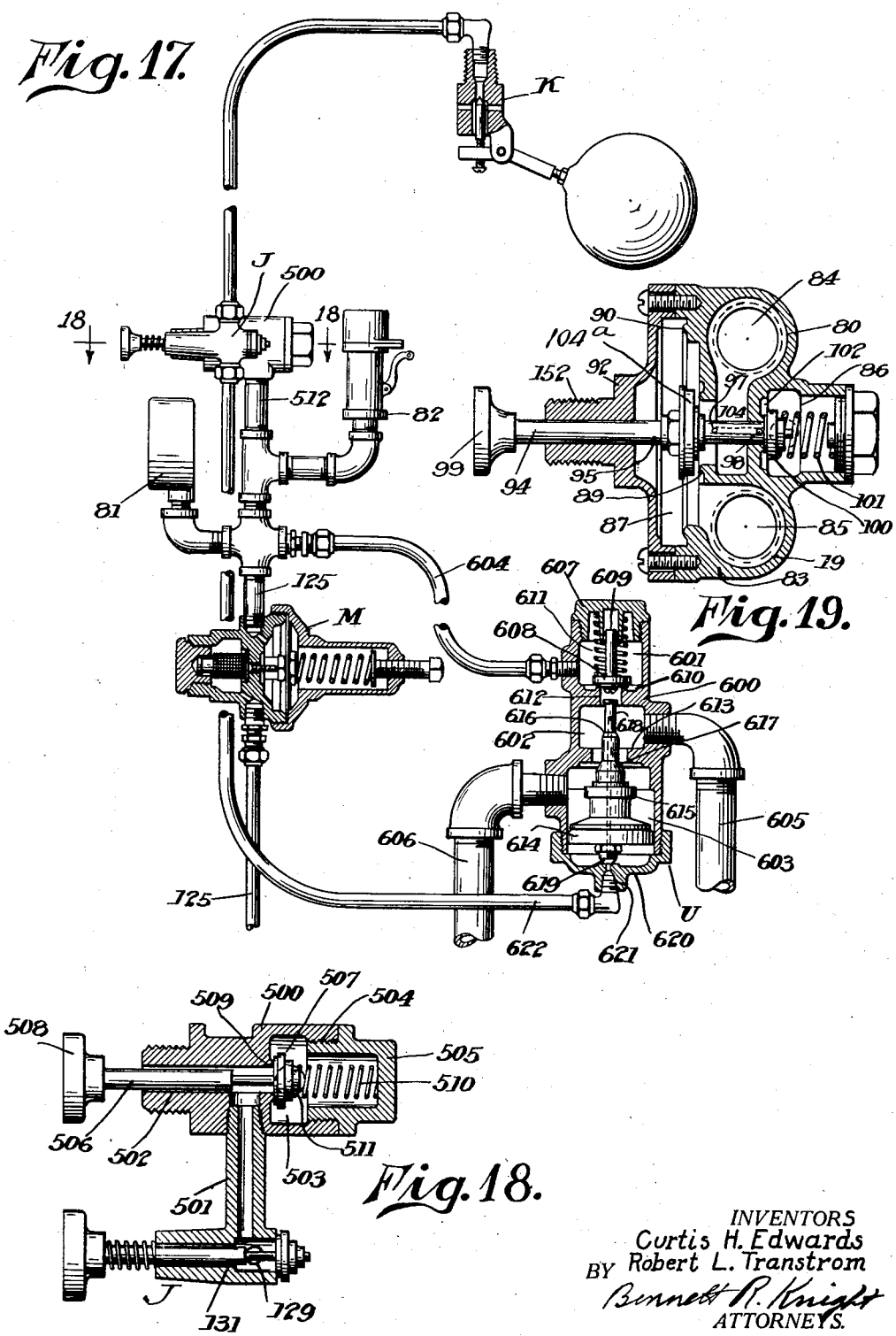

1,811,114

UNITED STATES PATENT OFFICE

CURTIS H. EDWARDS AND ROBERT L. TRANSTROM, OF LOS ANGELES, CALIFORNIA, ASSIGNORS, BY MESNE ASSIGNMENTS, TO WAYNE COMPANY, OF FORT WAYNE, INDIANA, A CORPORATION OF INDIANA

DISPENSING APPARATUS

Application filed November 10, 1926. Serial No. 147,474.

This invention relates to improvements in dispensing apparatus of that character which is utilized in liquid dispensing stations such as gasoline stations, and the invention has for an object the provision of a dispensing system which combines safety features as well as a simplified system providing a fool-proof operation of the said apparatus.

The present invention operates upon what may be termed the siphon system, in that the liquid, whatever its character, is siphoned to the dispensing apparatus per se. In this connection the cylinder receiving the liquid is so arranged that air therein is readily valved from the said cylinder to the end that a correct level of the liquid is maintained and so that the apparatus is accurate as to both the amount of liquid received within the said cylinder or dispensed therefrom in measured quantities. The said invention likewise contemplates a novel arrangement and system of control which allows the liquid within the dispensing cylinder to be readily returned to the source of supply in case of fire or from any other cause. Furthermore, the various parts of the dispensing apparatus are so arranged that a single control automatically permits the dispensing cylinder to be drained of liquid.

The invention has for further objects the provision of a simplified system and apparatus which is economical in construction, rapid of operation and of great utility.

With the above and other objects in view, the invention consists in the novel and useful provision, formation, construction, association and inter-relation of parts, members and features, all as shown in certain embodiments in the drawings, described generally, and more particularly pointed out in claims.

In the drawings:

Figure 1 is a fragmentary elevation illustrating the general piping arrangement between the source of supply and the dispensing apparatus;

Figure 2 is a modified form of supply tank;

Figure 3 is a vertical sectional view of a valve which may be utilized in practicing the invention;

Figure 4 is a fragmentary and vertical sectional view of the dispensing apparatus shown in Figure 1 and on an enlarged scale from the showing of Figure 1;

Figure 5 is a vertical sectional view of the valve shown in Figure 3, with said valve filled with liquid;

Figure 6 is a partial sectional view on the line 6—6 of Figure 2, and on an enlarged scale;

Figure 7 is a sectional view on the line 7—7 of Fig. 4, and on an enlarged scale;

Figure 8 is an elevation partly in section of valve mechanism utilized in practicing one embodiment of the invention;

Figure 9 is a sectional view on the line 9—9 of Fig. 8, and on an enlarged scale from said figure;

Figure 10 is a sectional view on the line 10—10 of Fig. 9;

Figure 11 is a vertical section on the line 11—11 of Fig. 4;

Figure 12 is an elevation of a dispensing nozzle and shown in its inoperative position;

Figure 13 is a plan view of the showing of Figure 12;

Figure 14 is an enlarged view of the nozzle, with certain parts in section to show details of the construction thereof;

Figure 15 is a sectional view on the line 15—15 of Fig. 14;

Figure 16 is a modified form of drain valve, parts being shown in section;

Figure 17 is a modified form of valve mechanism;

Figure 18 is a sectional view on the line 18—18 of Figure 17, and on an enlarged scale; and, Figure 19 is a sectional view of a valve similar to that shown in Figure 9, but arranged for manual control.

Corresponding parts in all the figures are designated by the same reference characters.

Before describing in detail the various devices and elements entering into our invention, we desire to point out the general operation and purposes of certain elements entering into this improved dispensing system for gasoline or other liquids. It is customary to provide a visible dispensing unit which consists of a standard with a dispensing cylinder adapted to hold measured quantities of gasoline and from which cylinder gasoline is dispensed to users. Likewise the dispensing device is directly piped to a supply tank containing gasoline. Usually some form of pump is utilized between the source of supply and the dispensing device. In the present instance we propose to provide what may be termed a pressure tank preferably situated below the supply tank and we intend to siphon the gasoline from the supply tank to the pressure tank, and thence through piping to raise the gasoline from the pressure tank to the dispensing device. It is highly essential that means be used to prevent air from entering the dispensing cylinder, as this air would tend to change the level of any gasoline therein and in a way prevent correct measured quantities of gasoline from being dispensed therefrom. As a consequence we have provided novel forms of valves which prevent air from entering the dispensing cylinder, and furthermore, a novel system of check valves for relieving air pressure from the gasoline lines. If the supply tank becomes empty of a liquid, which would of course empty the pressure tank, novel valve means will relieve the pressure of air within the same upon re-priming the pressure tank and filling the supply tank, while a novel form of valve will prevent any air from entering the dispensing cylinder during such operation, or for that matter, prior to a priming of the pressure tank and supply tank.

To briefly consider the operation, assuming that the pressure tank and supply tank are both filled with gasoline, upon setting a valve known as a control valve, air under pressure is permitted to contact with the surface of the gasoline in the pressure tank which will force said gasoline into the dispensing cylinder. When the gasoline has reached a determined level within said cylinder the valve is automatically opened, which will release air pressure upon the control valve and automatically open the air line leading to the pressure tank so that further gasoline would not be forced from the pressure tank upwardly into the dispensing cylinder. The gasoline may be dispensed from the dispensing cylinder through any form of hose having a valve therein, although the present invention contemplates a novel nozzle having a valve for this purpose. Another feature of the invention resides in the provision of a combined drain and overflow valve, the drain portion of which becomes effective upon the closing of a door associated with the standard of the dispensing unit.

Referring with particularly to the drawings, the several elements entering into the invention are generally designated by the following: A a supply tank, B a pressure tank adapted to be associated with the supply tank, C the dispensing unit, D a valve controlling the passage of liquid from the pressure tank to the dispensing unit, E valve adapted to prevent entrance of air within the cylinder of the dispensing unit, F a drain valve, H a novel form of valve nozzle, J and K valves adapted to operate the valve D, and M a reducing valve,—all of which elements together with piping connecting the same, are adapted to operate together in practicing one embodiment of the invention, in that said elements will function during a filling of the dispensing cylinder and the discharge of liquid therefrom.

The elements and units D, et seq., are all directly associated with the dispensing unit C, and adapted to form a part thereof; the ground line is shown in Fig. 1 at 1, and adapted to be sunk within the ground is the supply tank A and the pressure tank B, and it will be noted from Fig. 1 that the pressure tank is considerably lower than the supply tank. A pipe 2 enters the supply tank and terminates adjacent the lowermost portion thereof, with the said pipe 2 at said portion carrying a foot valve 3. A T 4 permits connection with a pipe 5 and the pipe 2 and and an elbow 6 connects the pipe 5 with a pipe 7, the pipe 7 entering the pressure tank B with an end terminating adjacent the base of said pressure tank, as shown at 8. Secured to the T 4 is a reducer fitting 9 which accommodates a pipe 10 which carries a check valve 11. A pipe 12 is passed within the tank B terminating a short distance above the base thereof and which pipe communicates with the valve E within the dispensing unit C, and likewise communicates, after leaving said valve E, with the dispensing cylinder $a$ of the dispensing unit. This pipe 12 is known as the liquid inlet pipe. The pipe 12 has included in its length a fitting 13. A small pipe 14 is secured to the said fitting and with the check valve 11. This latter pipe 14 is for the purpose of allowing a by-pass for air when filling the supply tank and the pressure tank. In other words, any air within the supply tank or the pressure tank would be forced upwardly through the pipes 2 and 12 and out through the check valve 11. To prime the tanks A and B we provide two priming inlet pipes 15 and 16, the pipe 15 communicating with the tank A and the pipe 16 with the tank B. These two pipes have their inlets above the surface of the ground 1 and suitably protected by covers. An overflow pipe 17 from the dispensing unit also communicates with the pipe 15. In order to maintain atmospheric pressure upon the surface of any liquid in the supply tank so that the supply tank would at all times function properly, a vent pipe 18 is provided, and in the showing of Figure 1 a second vent pipe 19 communicates with the valve D.

As has been stated, the dispensing unit has a dispensing cylinder *a*, which in the present instance is formed of some material such as glass, so that the level of the liquid therein may be readily ascertained, and which cylinder is suitably supported upon a base 20, the base being supported by uprights or standards 21, and which standards are surrounded by a skirting 22. The pipe 12 is secured to said base, and a second pipe 12ª directly connected to the pipe 12 is within the cylinder. This latter pipe terminates adjacent the top of said cylinder, and whereby any liquid passed through pipes is received within the cylinder. As is customary the pipe 12ª has a cap or hood 23 to prevent splashing of liquid. Considering the invention so far, and assuming both the tanks A and B as empty, the procedure would be first to fill both the said tanks by pouring liquid through the pipes 15 and 16. After air under pressure has been relieved, liquid is siphoned from tank A to tank B. In particular the valve E is shown in Figs. 3 and 5. Said valve includes a housing 30 which comprises top and bottom members 31 and 32 adapted to hold therebetween a cylindrical member 33, the said top and bottom members being held to said cylindrical member by means of bolts 34. The top and bottom members are of identical construction and for that reason like reference characters will apply, the top being described; said top is substantially annular and formed with exterior and interior annular flanges 35 and 36, both of which flanges are internally screw-threaded. Secured to the flange 35 of the bottom member is one end of the pipe 12 and a second length of said pipe 12 is secured to the screw threads 5 of the top member 31. A short length of pipe 37 is secured to the threads 36 of the bottom member and adapted for movement upon said pipe is a hollow annular float 38. Depending from the innermost flange of the top member 31 is a tubular member 39, having a capped end 40. This capped end is provided with a chamber portion 41 directly communicating with the interior of the tubular member 39 and likewise permitting communication between the chamber 41 and the interior of the cylinder 33 under certain conditions. To this end the top is provided with one or more openings 42. Slidably carried on the tubular member 39 is a disc 43 and which disc has depending therefrom legs 44.

The operation of this particular device is as follows: It is of course necessary to release the air pressure from within the tank B before attempting to re-prime and effect flow of gasoline between the tanks A and B. Assuming that this pressure has been relieved from the tank B the device E will then be operative as follows: The general appearance of the device E will be as shown in Figure 3 and as gasoline enters the housing 30 the float 38 is raised which will tend to raise the disc 43, due to the fact that the legs or depending portions 44 of said disc are in contact with the float. When this occurs gasoline would flow through the ports or openings 42, and thence into the pipe 12. Until enough gasoline enters the housing to raise the float the valve disc 43 remains over the port openings 42, closing the same, as illustrated in Figure 3. Of course the gasoline entering the housing will tend to compress whatever air is therein and air pressure will to a certain extent tend to hold the disc 43 over the openings 42 until sufficient gasoline enters to raise the float, at which time the gasoline would flow directly through said ports or openings 42. In other words, there is a balancing of pressures within the said housing and the air pressure tends to retain the valve disc in place until the pressure of the gasoline supply over-balances the air pressure.

The several means whereby the dispensing cylinder *a* may be filled with gasoline or other liquid will now be described. The cylinder *a* has a top ring or flange member 60 substantially annular in form with a top-piece 61 joined thereto. This top-piece 61 is provided with a valve P whereby air may enter the dispensing cylinder. Said valve P is shown in Fig. 7 and includes a hollow screw-threaded stud 62 having a hollow cap end 63 located inside the cylinder *a*. A portion of the stud is reduced as to diameter and screw-threaded as shown at 64, the screw-threaded portion being passed through an opening in the plate 61 with a nut 65 received thereon for clamping the stud to said plate. The cap has its top portion formed with ports 66 communicating with the interior 67 of the cap, and adapted to surround the stud and normally cover the ports is a disc 68. In order that gasoline would properly flow from the dispensing cylinder it is essential that there be maintained within said cylinder air under atmospheric pressure and the requisite amount of air may enter through the hollow stud and through the ports 66 and past the disc 68. A tube, pipe, or the like 80 permits communication between the tank B and the valve D, and included within the length of said pipe 80 is a pressure gage 81 and a pop-valve 82. The said valve D includes a housing 83 so divided as to provide a pressure chamber 84, a vent chamber 85, an inlet chamber 86, and a control chamber 87. The pressure chamber 84 is adapted to communicate with the control chamber through an opening 88, there being a valve seat portion 89 bounding said opening, and said housing is likewise formed with a valve seat 90. The vent chamber has communication with the control chamber while the inlet chamber 86 does not have any direct communication with any of the other chambers except upon actuation of a member to be described. In particular, the said valve housing is formed with a bore 91 and the said housing is provided with a cap member 92 likewise formed with a bore 93 and received within the said bores 91 and 93 is a valve stem 94. This valve stem is formed with an axial bore 95 having outlet openings from said bore, as shown at 96, 97 and 98. This stem is formed with a finger-piece 99 at one end thereof, while the opposite end carries a valve disc 100, which valve disc is normally urged by a coil spring 101, within the inlet chamber 86, against a seat 102 bounding the bore 91. Also carried by the said stem is a large valve disc 103 adapted at times to contact with the valve seat 90 and a smaller disc 104 adapted for contact with the valve seat 89. Both valve discs 103 and 104 respectively are seated upon their respective seats at the same time.

A pipe 125 communicates with a source of air supply under pressure, not shown, and then communicates with the reducing valve M which regulates the air pressure. A second pipe 126 leading from said valve communicates with the inlet chamber 86 of valve D, and a pipe 80 communicates with the pressure chamber 84 of the latter valve.

The vent pipe 19 communicates with the vent chamber 85. Communicating with the control chamber 87 is the valve J. The valve J is of the manually operable type and includes a housing 128 provided with two bores at substantially right angles as shown at 129 and 130, the bore 130 having a portion of larger diameter 131 and the said bores all communicate. Within the bore 130 is a valve stem 132, one end of which stem, exterior the housing, is provided with a finger-piece 133 and a coil spring 134 surrounds the stem between an end of the housing and said finger-piece, while the opposite end of said stem carries a valve plug or disc 135. Normally this disc or plug covers the opening 131 so that the opening does not communicate with the atmosphere. The housing is screw-threaded at 136 within the valve D and the bore 129 thereof is in communication with the control chamber 87. The bore 129 likewise communicates with a pipe 137 leading to the valve K. This valve K includes a housing 138 having a central bore 139 and an intersecting cross bore 140. The central bore 139 varies as to diameter as shown at 141 and received within the bore 141 is a needle valve 142. Secured to the housing is a leg 143 and pivoted to said leg is an arm 144 carrying a float 145 and said arm likewise has connection with the needle valve 142, as shown at 146. The housing is screw-threaded at 147, and such screw-threaded portion is passed through an opening in the disc 61 with a nut or the like 148 upon said screw threads for clamping the member 61 between the housing and said nut, as illustrated in Figure 4. The skirt portion of the dispensing unit is formed with a housing 150 which is provided with a swing door 151. The finger-piece 133 for the valve J and the finger-piece 99 of the valve D are received within said housing, as shown in Figure 4, and the valve D is secured to said housing by providing the cover of said valve with a screw-threaded portion 152, which screw-threaded portion is passed through an opening in the said housing. Thus, when a nut is secured to the screw threads 152 a portion of the housing wall is secured as between said nut and the cover. The reducing valve M will not be described in detail, although a cross section thereof is shown in Figure 17, as such reducing valve is of standard form.

The operation of the devices so far described, is as follows: If we assume that the supply tank as well as the pressure tank are filled with gasoline and it is desired to fill the dispensing cylinder $a$, the various elements of the said dispensing units will be in the position shown in Figs. 4 and 8. In order to cause the gasoline to be lifted from the pressure tank B into the dispensing cylinder $a$ it will be necessary to push the finger-piece 99 of the valve D inwardly to seat the valve discs 103 and 104 and unseat the disc 100 so that air under pressure will pass from the inlet chamber 86 into the pressure chamber 84 by such air under pressure passing through the port 98, longitudinal bore 93, and out through the port 97. This air under pressure after entering the pressure chamber 84 will pass within the pipe 80 and in turn communicate with the pressure tank B above the surface of any gasoline within said pressure tank. This will raise the liquid within the pipe 12, and allow it to flow within the dispensing cylinder $a$. Air of course will enter the chamber 87 through the port 96 and behind the disc 103. As the valve K is closed, due to the fact that the weight of the ball 145 holds the needle valve 142 seated to prevent any passage of air through the port 140 into the port 139, said air will build up a pressure back of the said disc 103. Likewise the disc 103 has a greater surface area than the disc 100 with the consequence that pressure against the disc 103 will be considerably greater than against the disc 100, and this will tend to hold the disc 103 seated, which, of course, would hold the disc 104 seated. The position now assumed by the discs is shown in Fig. 10. As the gasoline rises within the said cylinder it will finally reach a level where it will raise the ball 145 sufficiently to move the needle valve 142, and when this occurs the air pressure within the line 137 and behind the disc 103 will be relieved and the spring 101 will then urge the said disc 103 from its seated position. When this occurs further passage of gasoline within the cylinder a is immediately stopped because communication between the inlet chamber 86 and the pressure chamber 84 is closed and the control chamber 87 is in communication with the vent chamber 85. If for any reason it is desired to suddenly stop the flow of gasoline within the dispensing cylinder, this could be readily accomplished by opening the valve J as would be self-evident.

The method just described provides for automatically filling the dispensing cylinder after the valve D has been once set. If it is not desired to use the valves J and K the valve D may then take the form shown in Figure 19, which is the same as the valve just described, with the exception that the control compartment is closed; that is to say, has no communication with any other valves. The operation would be practically the same as the valve D previously described, the one difference being that it is necessary to hold the valve disc 104ª seated during a filling of the cylinder a, and upon releasing the finger-piece further filling of the cylinder is stopped.

The base 20 of the dispensing cylinder is formed with a screw-threaded opening 200 and secured to the screw threads thereof is a drain pipe 201. Likewise concentric within said drain pipe and entering the said cylinder a is an overflow pipe 202. Both the drain and over-flow pipes are associated with a drain valve Q. The valve Q includes a housing 203 having two compartments or chamber portions 204 and 205. A wall formed with a valved opening 206 is between the compartments 204 and 205 and a valve disc 207 normally closes said valve opening. In particular the said disc is mounted upon a stem 208, one end of which is received within a bore 209 of a cap 210 which is screw-threaded to said housing, and a coil spring 211 lies between said valve disc and the cap. One end of the drain pipe 201 is screw-threaded to the housing and in communication with the chamber 204, while an end of the overflow pipe 202 passes through a portion of said chamber 204 and is in communication with the chamber 205. The overflow pipe 17 is in communication with the chamber 205. An elongated guide housing 213 is secured to the housing 203 and passed through a central opening of said housing 213 is a stem 214, one end of which carries a head 215 which is within the chamber 205 and the opposite end of which stem carries a finger-piece 216. A stuffing box 217 is between the stem and its housing and a coil spring 218 is between said stuffing box and a second cap 219. The stem 208 extends beyond the disc 207 and into the chamber 205. When the liquid within the cylinder a reaches a certain level it will overflow into the pipe 202 and straight through the chamber 205 into the overflow pipe 17, and back into the supply tank A. If it were desired to drain the cylinder a, this might be accomplished by pushing inwardly upon the finger-piece 216 which would unseat the valve disc 207 and allow liquid to pass from the chamber 204 into the chamber 205 and hence into the pipe 17.

After the dispensing cylinder a has been filled to proper level with the gasoline, the same may be dispensed to a user through the usual hose 250, one end of which hose is connected to a valve 251 which in turn is connected to the base 20 and in communication with a port 252 leading from said valve to the interior of the cylinder. The opposite end of the hose carries a novel form of valve nozzle S shown in Figs. 12 and 14. The said valve nozzle includes a housing 300 having an annular partition or flange therein 301 provided with a valve seat 302. A fitting 303 is screw-threaded to said housing at 304, and said fitting is formed with a spider having an enlarged central bore as shown at 305. A valve stem 306 is received within the said bore and said stem carries a valve disc 307 which is normally urged to seated position by a coil spring 308. An elongated nozzle 309 is secured to said housing and whereby when the disc 307 is unseated liquid may be passed through the housing and nozzle for discharge therefrom. The nozzle carries a lug 310 to which is hingedly connected a guard 311 substantially U-shaped in cross section and which guard is adapted to confine at times an operating lever 312, said lever being pivoted to said guard at 313. The opposite end of said guard is secured to a lug 315 on the fitting 303. The said housing is adapted to receive an annular fitting 316 provided with a stuffing box portion 317, and passed through said stuffing box portion and the said fitting is a stem 318. When the operating lever 312 is moved upwardly in the direction of the arrow of Figure 14, by the finger grasping the same, one end of said lever will contact with the stem 318 which will contact with the valve stem and open the valve. When it is necessary to remove the packing and replace it with new packing at the stuffing box portion 317. To do this the pin secured to the lug and the guard at 315 may be removed and the guard swung with relation to its hinge portion 310, whereupon the stem 318 might be renewed as well. If for any purpose whatsoever it is desired to drain the dispensing cylinder, the door 151 might be closed over the housing 150 and an enlargement 350 on said door would contact with the finger-piece 216 of the drain valve to permit such a draining of any liquid within the cylinder a, and the said door is provided with a catch 351 to hold the said door closed to the housing. Furthermore, the said door is provided with an outwardly projecting hook 352 (see Figs. 6, 12 and 13). The nozzle shown in Fig. 14 would first be placed in position adjacent the skirting 22, said skirting to this end being provided with an eye member 353 through which is passed the nozzle 309, and a projecting portion 354 on the skirting is adapted to be received between the operating lever and the guard, as shown in the Figures. When the door 151 is closed the hook 352 will hold the device S against removal.

Certain modifications of different elements entering into the invention are likewise shown in the drawings. We may combine as one unit the said supply tank A and the pressure tank B in the manner illustrated in Fig. 2 wherein a casing 400 is provided with an upper and a lower compartment 401—402 respectively. The compartment 401 would act as a supply tank portion and the compartment 402 the pressure tank portion. A pipe 403 would communicate with the pressure tank 402 and a pipe 404 would act as an auxiliary filling pipe. A pipe 405 acts in the same capacity as the pipe 12 in that the liquid is forced therethrough into the dispensing cylinder. This pipe 405 is passed through a stuffing box 406 in an upper portion of the housing, and an end portion of said pipe is secured to a valve 407. This valve includes a casing or housing 408, to which is secured a spider 409. This spider is provided with a central opening which is screw-threaded to accommodate and receive a pipe 410 passed into the tank 402. A central portion of said spider is likewise formed with a valve seat portion 411 and a second member 412 provided with a valve seat portion is secured within the housing. A valve disc 413 formed with a central opening is normally seated upon the two valve seats 411 and 412.

The operation of this device shown in Fig. 2 is as follows: As long as the pressure tank is filled with liquid and a pressure is maintained on the surface of said liquid by air being admitted through the pipe 403 the liquid will flow upwardly within the pipe 410 and through the annular opening of the valve disc and into the pipe 405 and the pressure of said liquid will maintain the valve disc 413 seated. When the pressure is relieved from the surface of the liquid in the tank 402 liquid pressure in the tank 401 will lift the valve disc 413 from its seated position and allow the liquid to pass within the pipe 410 and into the tank 402. In other words, a gravity method of filling the tank 402 is provided.

In Figure 16 we have illustrated a modified form of drain valve and like reference characters will apply wherever the several parts are the same as for the valve shown in Figure 11. To this end the housing would be the same. However, the valve disc 450 is provided with an elongated stem 451, the said housing being provided with an enlargement 452 formed with a central bore through which the said stem is passed. Included as between a wall of the housing and surrounding the enlargement 452 and bearing against a surface of the disc 450 is a coil spring 453 which normally urges the disc to a seated position on its valve seat. The stem is secured to a catch member 454 through the medium of links 455, 456, and 457, and the said catch is formed with a hook end 458 and with a notch portion 459. The said catch is adapted to be passed through an opening 460 in the skirting, the notch 459 engaging the portion of the skirting bounding said opening 460. The door 151 is provided with an enlargement 461, and when the door is closed the door will contact with the hook and lift the catch upwardly so that the notch portion will disengage the skirting and whereby the valve disc 450, under urgency of the spring 453 will be unseated from its valve seat and the hook 458 will engage the skirting so as to prevent further inward movement of said catch.

The form of the invention shown in Figs. 17 and 18 provides certain novel features over the form showing in Fig. 8. Wherever possible, parts of the same construction will be given like reference characters. The air under pressure is led through the line 125 to the reducing valve M and from said reducing valve to what may be termed a master valve 500. Included in the line which leads from the reducing valve is the pop-valve 82 and the pressure gage 81. The valve K is provided as before and said valve is connected to the manually operable valve J′. This manually operable valve differs from the valve J in one particular, namely, the said valve is provided with a bored extension 501 whereby it has connection with the master valve, the bore of said extension communicating with the bore 131 of said valve. The master valve includes a housing formed with a bore 502 communicating with a chamber 503. The bore in the extension 501 communicates with the bore 502. A portion of the chamber 503 is screw-threaded at 504 to receive a cap nut 505. A valve stem 506 is passed through the bore 502 and carries at one end a valve disc 507 and at the opposite end a finger-piece 508. Said valve disc is urged to a seated position upon a valve seat 509 through the medium of a coil spring 510. An opening 511 is in communication with the chamber 503. The pressure line 125 and particularly that portion thereof at 512 communicates with said opening 511. The control valve is in many respects similar to the control valve shown in Fig. 9. However, this latter valve will be designated as U and the same includes a housing 600 provided with an inlet chamber 601, a pressure chamber 602 and a control chamber 603. A pipe 604 permits communication between the inlet chamber and the line 125. A second pipe 605 is in communication with the pressure chamber and this pipe leads to the tank B. A further pipe 606 is in communication with the control chamber 603 and this pipe connects with the vent pipe 19. The housing at the chamber portion 601 carries an end cap 607, and a disc 608 provided with a stem 609 is within said chamber 601 and is normally urged to a seated position on a valve seat 610 by a coiled spring 611. It is to be noted that the housing is provided with an inwardly projecting flange 612 formed with a central bore and this flange acts to separate the chambers 601 and 602 and the said disc 608 normally closes port 612 between the said chambers aforesaid. There is likewise an annular flange 613 between the chambers 602 and 603. Within the chamber 603 is a plunger 614 and said plunger carries a valve disc 615, said plunger and said disc being mounted upon a stem 616 formed with a central bore 617. This said stem extends between the chambers 602 and 603 and in part extends through the port 612. Likewise two small port openings 618 and 619 are in communication with the central bore 617. The said housing carries an end cap 620 formed with a central screw-threaded opening 621 and a pipe 622 communicates with said opening and with the manually operable valve J communicating with the opening 129 thereof.

The operation of this system is as follows: Assuming the parts in the position of Figure 17, upon pushing inwardly upon the finger-piece 508 (see Fig. 18) air under pressure from the line 125 will be received within the chamber 603 and passed from said chamber through the bore in the extension 501 and thence into the pipe 622 through the opening 129 of the manually operable valve. This air under pressure will then be received within the chamber 603 in back of the plunger, which air under pressure will raise the plunger and in turn raise the stem 616 causing the disc 615 to seat and close the port between the chambers 602 and 603 and to unseat the disc 608 permitting air under pressure to pass from the pipe 604 into the chamber 601, the chamber 602, and into the pipe 605. The air under pressure will also pass through the port 618 into bore 616 and out of port 619 into chamber 603 building up a pressure back of plunger 614. Therefore it is unnecessary to hold the valve K open in order to maintain valve disc 608 unseated. Rising gasoline or other liquid causes K to be operated, this will break the air pressure back of the plunger 614 allowing the plunger to drop by gravity and the disc 609 will then seat and any air under pressure in the pipe 605 will be relieved through the vent pipe 606. The manually operable valve J will operate the same as before, if it is so desired.

As a brief resume of the operation of the several devices, the first essential would be to fill the supply tank A and the pressure tank B with liquid through the lines 15 and 16, the air pressure within the tank B of course being relieved. When air under pressure is then passed within the tank B, liquid will be forced upwardly within the pipe 12 and any air ahead of said liquid will be vented through the valve 11 and the valve E will likewise operate to prevent air under pressure from entering the dispensing cylinder $a$. This air under pressure for the purpose of raising liquid from the pressure tank to the cylinder $a$ is controlled through the medium of a master valve D or U. This master valve of either form has direct connection with the source of air supply under pressure and controls passage of said air to the tank B. The valve D when once set will remain set until the dispensing cylinder $a$ is filled, whereupon the valve will be opened so that air under pressure will no longer be directed to the tank B, and thus flow of liquid to the dispensing cylinder would be stopped. Any liquid within the dispensing cylinder may be delivered to a consumer in measured quantities, through a hose carrying a valved nozzle. At night time or in case of fire when it is desired to remove all liquid from the dispensing cylinder, a door on the skirting unit upon being closed will operate a drain valve and drain the said cylinder, permitting the liquid so drained to be delivered back to the supply tank A.

It is obvious that various changes and modifications may be made in practicing the invention, in departure from the particular showing of the drawings, without departing from the true spirit of the invention.

Having thus disclosed our invention, we claim and desire to secure by Letters Patent:

1. Apparatus of the character disclosed, including a dispensing cylinder, an overflow pipe within said cylinder, a drain pipe at the base of said cylinder, and valve means between the overflow pipe and the drain pipe, and a second drain pipe joined to said valve whereby when the valve is open liquid will pass from the first drain pipe into the second drain pipe.

2. Apparatus of the character disclosed, including a dispensing cylinder adapted to hold liquid, an overflow pipe within the dispensing cylinder, a drain pipe in the base of said dispensing cylinder, a second drain pipe, and a valve associated with the first and second drain pipes and the overflow pipe, said valve when in one position permitting liquid to pass through the overflow pipe and through the second named drain pipe, and when in a second position establishing communicaton between the overflow pipe, the first drain pipe, and the second drain pipe.

3. In apparatus of the character disclosed having a dispensing cylinder for liquid, and a valved nozzle for controlling the dispensing of liquid from said cylinder; a housing for the cylinder and means on said housing for maintaining the nozzle in one position, said means functioning to prevent operation of the valve of said nozzle when the nozzle is so positioned on the housing.

In testimony whereof, we have signed our names to this specification.

CURTIS H. EDWARDS.
ROBERT L. TRANSTROM.